United States Patent
Dietrich et al.

(10) Patent No.: US 10,060,482 B2
(45) Date of Patent: Aug. 28, 2018

(54) JOINT-SITE DESIGN COMPRISING A HUB AND A SHAFT OR A GEAR BEING FRICTION WELDED

(71) Applicant: Magna Powertrain AG & Co KG, Lannach (AT)

(72) Inventors: Alexander Dietrich, Ehrenhausen (AT); Steve Keaton, Greenfield, IN (US); Heinz Karl Klampfl, Bärnbach (AT); Aaron Phillips, Yorktown, IN (US)

(73) Assignee: MAGNA POWERTRAIN AG & CO KG, Lannach (AT)

( * ) Notice: Subject to any disclaimer, the term of this patent is extended or adjusted under 35 U.S.C. 154(b) by 451 days.

(21) Appl. No.: 14/761,153

(22) PCT Filed: Jan. 16, 2014

(86) PCT No.: PCT/EP2014/050790
§ 371 (c)(1),
(2) Date: Jul. 15, 2015

(87) PCT Pub. No.: WO2014/111459
PCT Pub. Date: Jul. 24, 2014

(65) Prior Publication Data
US 2016/0305483 A1  Oct. 20, 2016

(51) Int. Cl.
*F16D 1/068* (2006.01)
*F16D 1/027* (2006.01)
(Continued)

(52) U.S. Cl.
CPC .............. *F16D 1/068* (2013.01); *B23K 20/12* (2013.01); *B23K 20/129* (2013.01);
(Continued)

(58) Field of Classification Search
CPC .......... B23K 2201/06; B23K 2201/006; B23K 20/121; B23K 20/122; B23K 20/12;
(Continued)

(56) References Cited

U.S. PATENT DOCUMENTS 3,175,284 A  *  3/1965  Cotovsky ............. B23K 20/129
                                            228/114
3,269,002 A  *  8/1966  Hollander ............. B23K 20/12
                                            228/113

(Continued)

FOREIGN PATENT DOCUMENTS

CN           1334168 A        2/2002
CN         101309775 A       11/2008
(Continued)

OTHER PUBLICATIONS

Search Results dated Aug. 25, 2016 from the State Intellectual Property Office in corresponding Chinese Patent Application No. 201480005409.0.
(Continued)

*Primary Examiner* — Daniel J Wiley
(74) *Attorney, Agent, or Firm* — Dickinson Wright PLLC

(57) ABSTRACT

A joint site design for friction welding of a shaft of a hard material with a hub consisting of softer material, wherein the shaft has a tubular shape with an end face being joined to the hub having a connection area with a flat shape formed by a radial shoulder of the hub.

19 Claims, 6 Drawing Sheets

(51) Int. Cl.
*B23K 20/12* (2006.01)
*B23K 33/00* (2006.01)
*B23K 101/00* (2006.01)
*B23K 101/06* (2006.01)
*B23K 103/18* (2006.01)
*B23K 103/10* (2006.01)

(52) U.S. Cl.
CPC ............ *B23K 33/006* (2013.01); *F16D 1/027* (2013.01); *B23K 2201/006* (2013.01); *B23K 2201/06* (2013.01); *B23K 2203/10* (2013.01); *B23K 2203/18* (2013.01); *Y10T 403/478* (2015.01)

(58) Field of Classification Search
CPC . B23K 20/129; B29C 65/0672; F16D 13/644; F16D 13/646; F16D 13/068; F16D 13/027
See application file for complete search history.

(56) References Cited

U.S. PATENT DOCUMENTS

| | | | | |
|---|---|---|---|---|
| 3,269,003 | A * | 8/1966 | Hollander | B23K 20/12 228/114.5 |
| 3,421,201 | A * | 1/1969 | Oberle | B22D 19/00 228/113 |
| 3,429,591 | A * | 2/1969 | Loyd | B23K 20/129 285/189 |
| 3,452,421 | A * | 7/1969 | McKinley | B23K 20/12 228/114.5 |
| 3,631,585 | A * | 1/1972 | Stamm | B23K 20/129 228/114.5 |
| 3,762,030 | A * | 10/1973 | Rajala | B23K 20/129 228/114 |
| 3,777,360 | A * | 12/1973 | Welch | B23K 20/129 228/114.5 |
| 3,853,258 | A * | 12/1974 | Louw | B23K 20/12 156/73.5 |
| 4,087,038 | A * | 5/1978 | Yagi | B23K 20/129 228/114.5 |
| 4,211,589 | A * | 7/1980 | Fisher | F16C 3/026 156/172 |
| 4,242,888 | A * | 1/1981 | Komeiji | F16D 3/207 228/114.5 |
| 4,331,280 | A * | 5/1982 | Terabayashi | B23K 20/129 228/114.5 |
| 4,333,671 | A * | 6/1982 | Holko | B23K 20/129 228/112.1 |
| 4,768,839 | A * | 9/1988 | Spindler | B23K 20/129 301/124.1 |
| 4,817,852 | A * | 4/1989 | Hill | B23K 20/129 228/113 |
| 4,832,769 | A * | 5/1989 | Shantz | B23K 20/129 156/294 |
| 4,944,977 | A * | 7/1990 | Shantz | B23K 20/129 138/89 |
| 5,064,112 | A * | 11/1991 | Isobe | B23K 20/129 228/112.1 |
| 5,154,340 | A * | 10/1992 | Peacock | B23K 20/12 228/114 |
| 5,167,310 | A * | 12/1992 | Fischer | F16D 13/644 192/113.1 |
| 5,205,464 | A * | 4/1993 | Simon | B21K 1/063 228/114 |
| 5,211,100 | A * | 5/1993 | Fuller | B23K 20/129 156/73.5 |
| 5,469,617 | A * | 11/1995 | Thomas | B23K 20/1215 164/108 |
| 5,492,264 | A * | 2/1996 | Wadleigh | B23K 20/12 228/112.1 |
| 5,495,977 | A * | 3/1996 | Hildebrandt | B23K 20/129 228/112.1 |
| 5,885,162 | A | 3/1999 | Sakamoto et al. | |
| 6,244,496 | B1 * | 6/2001 | Kato | B23K 20/129 228/112.1 |
| 6,295,893 | B1 * | 10/2001 | Ogawa | B21D 53/845 123/90.6 |
| 6,325,567 | B1 * | 12/2001 | Kato | B60G 7/001 228/112.1 |
| 6,491,206 | B2 * | 12/2002 | Stoppek | B23P 15/10 228/113 |
| 6,660,407 | B1 * | 12/2003 | Bender | B23K 20/129 228/112.1 |
| 6,691,910 | B2 * | 2/2004 | Hirose | C22C 29/08 228/114 |
| 6,767,071 | B2 * | 7/2004 | Cai | B23K 20/129 228/2.3 |
| 7,011,350 | B2 * | 3/2006 | Stol | B62D 23/005 29/890.043 |
| 7,726,541 | B2 * | 6/2010 | Maciel | B23K 20/122 228/112.1 |
| 7,726,542 | B2 * | 6/2010 | Kleber | B23K 20/12 156/73.5 |
| 7,866,532 | B1 | 1/2011 | Potter et al. | |
| 7,909,230 | B2 * | 3/2011 | Aiso | B29C 65/0672 228/112.1 |
| 8,434,962 | B2 * | 5/2013 | Christ | B23K 20/129 156/73.5 |
| 8,784,065 | B2 * | 7/2014 | Yang | B23K 20/129 148/527 |
| 2007/0172335 | A1 * | 7/2007 | Christ | B23K 20/129 411/408 |
| 2009/0220820 | A1 * | 9/2009 | Kolbe | B23K 20/129 428/654 |
| 2009/0317179 | A1 * | 12/2009 | Christ | B23K 20/12 403/271 |
| 2010/0098483 | A1 | 4/2010 | Toepker | |
| 2012/0121397 | A1 * | 5/2012 | Albuzat | B23K 20/12 415/182.1 |
| 2015/0258642 | A1 * | 9/2015 | Killian | B23P 15/14 29/893.34 |

FOREIGN PATENT DOCUMENTS

| | | |
|---|---|---|
| CN | 201815796 U | 5/2011 |
| CN | 102873461 A | 1/2013 |
| DE | 19519576 A1 | 12/1996 |
| DE | 19934855 C1 | 11/2000 |
| EP | 1198323 B1 | 5/2004 |
| JP | 06109101 A | 4/1994 |
| WO | 2012047562 A2 | 4/2012 |

OTHER PUBLICATIONS

Search Results dated Nov. 13, 2017 from the German Patent Office in corresponding GermanPatent Application No. 11 2014 000 490.1 (two pages).
Data Sheet for Steel Grades: Carbon Steel: JIS S 53 C; URL: http://www.steel-grades.com/Steel-Grades/Carbon-Steel/JIS-S-53-C.html; retrieved on-line Nov. 13, 2017 (four pages).
Data Sheet for Automotive Steel: JIS G3113-SAPH440; URL: http://www.automobile-steel.com/Automotive-steel/JIS-G3113SAPH440.html; retrieved on-line Nov. 13, 2017 (two pages).
German Wikipedia entry for "Härte"; JRL: https://de.wikipedia.org/wiki/Härte; retrieved Nov. 27, 2017 (thirteen pages).

* cited by examiner

JOINT-SITE DESIGN COMPRISING A HUB AND A SHAFT OR A GEAR BEING FRICTION WELDED

CROSS-REFERENCE TO RELATED APPLICATIONS

This application is a National Stage of International Application No. PCT/EP2014/050790 filed Jan. 16, 2014 which claims priority to U.S. application Ser. No. 13/746,032 filed Jan. 21, 2013. The entire disclosure of each of the above applications is incorporated herein by reference.

TECHNICAL FIELD

The invention relates to a joint site design for friction welding of a shaft of a hard material with a hub consisting of softer material.

BACKGROUND

In vehicle construction, composite workpieces which are composed of a shaft and an essentially rotationally symmetrical hub part are used in numerous applications. Examples of hubs are transmission and clutch parts or also disk-shaped blanks which are still to be mechanically processed.

It is known to join a shaft and hub part in a connection region by friction welding. In this case, an end face of the shaft is joined to an end face of the hub part in a conventional manner. Alternatively, the shaft and hub part can be joined by means of overlap friction welding; this involves a variant of pressure welding in which, in contrast to conventional end-face friction welding, the surfaces to be joined are arranged at the circumference of the components. In this case, for example, a shaft is welded to a hub part with overlap by one of the two components being set in rotation and being pressed onto the other stationary counterpart. The welding process starts at the contact surfaces of the components. After the plasticization of the material located there by the friction heat, a permanent joint is obtained after the end of the rotary movement.

Shown in DE 199 34 855 C1 is a friction-welded shaft/disk composite workpiece which is assembled from a disk having a through-hole and from a shaft by means of overlap friction welding. During the welding of shaft and disk, annular connection sections are produced, between which annular cavities are formed. A reduction in the weight of the entire part is achieved by the joint sites offset from one another radially and axially, it being possible for the cavities to be used, for example, for directing oil.

In the state of the art shafts and hubs for a composite clutch are connected by a intermeshing toothing between the components to achieve a frictional or positive fitting connection. The use of the clutches is mainly in transfer cases and automatic transmission applications.

Known applications have a so called "tube to tube" joint design. This means that friction welding takes place between two end faces which have a pipe shape. In comparison to the pipe shaped end face of the softer part the harder part has a larger or equal pipe outside diameter and a smaller or equal pipe inside diameter. With other words the harder part has an equal or larger end face than the soft part. This guarantees that the end face of the softer part will always fully touch the end face of the harder part. The harder side keeps being pipe shaped in the joining location, but the softer part has a flat surface in the joining location. This means that the softer part has the larger joining surface ("end face"). This has major advantages in terms of packaging and cost. The end face of the harder part is designed in a way that it is guaranteed that the typical material squeezing out can take place in order to create an atomic bond.

SUMMARY

The object of the invention is to specify a novel design of the joint site for a shaft-hub composite workpiece for a clutch, with which design the mechanical strength properties of the joint are increased.

The object is to find a joint design for friction welding of a harder material (higher melting point) with a softer material (lower melting point) with the challenge of having a simple and cheap part preparation and with the target of meeting lowest package specifications.

According the invention the joint design for friction welding of a harder with a significant softer material comprises a tubular shape on the harder and a flat shape on the softer side. This means the joint design is adapted to weld a material with a higher melting temperature with a material with significant lower melting temperature, where the side with higher melting temperature has a tubular shape and the side with lower melting temperature has a flat shape.

According to the invention, the joint-site structure of a shaft-hub composite work piece, in particular for joining a shaft to a connection area of a hub part of a clutch by means of friction welding, is designed in such a way that connection area of a hub part is located a defined distance apart the inner circumference of the hub part and the spread of the material softened during the friction welding is not flowing up to the edge of the hub part component.

The advantage is a reduction in manufacturing costs for the softer part. The variation of the friction welding shortening decreases significantly. The inventional solution reduces package space compared to state of the art friction welding joints. The invention allows the usage of low weighted materials for clutches replacing actual common designs.

To reduce weight of a vehicle all part has to be as light as constructional possible and the inventional solution opens a way to design a clutch with low weight material.

The projection or protrusion on account of the forced-out material at the joint site is preferably machined after the friction welding in order to obtain a rounded portion.

In an advantageous configuration of the invention, a plurality of joint sites axially offset from one another are provided between shaft and hub part. In this case, it is advantageous for the self-centering and relative axial orientation of the joining members during the friction welding to offset the joint sites of the joining members axially and radially relative to one another in such a way that the joint sites of the joining members on the composite workpiece, after the welding, are arranged at an angle of between 10 [deg.] to 20 [deg.], preferably 15 [deg.], to one another. The composite workpiece produced is then cylindrically symmetric.

This end-face friction welding of the shaft to the hub part avoids conical distortion of the hub part occurring due to asymmetrical shrinkage of the hub part after the friction welding. The method according to the invention is not associated with any conical distortion of the joining members at all; the original cylindrical symmetry of the two joining members is thus retained in the composite workpiece with high accuracy.

The shaft and hub part may be made of different materials. In particular, a hardened shaft may be used, and/or the hub part may be finish-machined (hardened, ground, etc.).

DRAWINGS

The invention is described below with reference to an exemplary embodiment shown in the schematic drawings. The drawings, the description and the claims contain numerous features in combination. The person skilled in the art will also expediently consider the features individually and form appropriate further combinations therefrom.

DESCRIPTION

Figure 1:
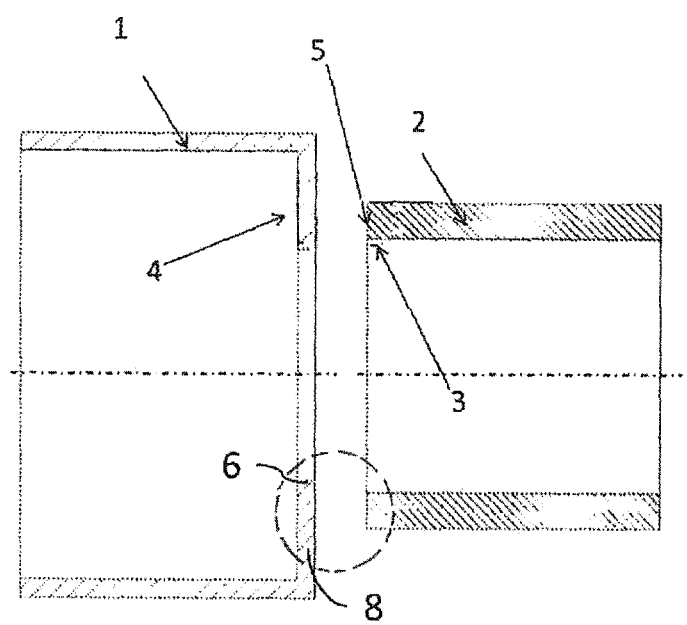
FIG. 1 illustrates a shaft and a hub part of a clutch configured to be friction welded along a connection area to define a joint site in accordance with an embodiment of the present invention.

According to FIG. 1, a shaft 2, e.g. an input shaft of a clutch, is joined to a hub part 1 of a clutch having a connection area 4.

The connection area 4 is formed at the surface of a radial shoulder 8 of the hub that forms a rim with a 90° angle between hub and shoulder. The radial shoulder 8 must have a dimension that allows the shaft to contact the end faces 5 to a flat area.

Figures 2A, 2B, 2C, 2D:
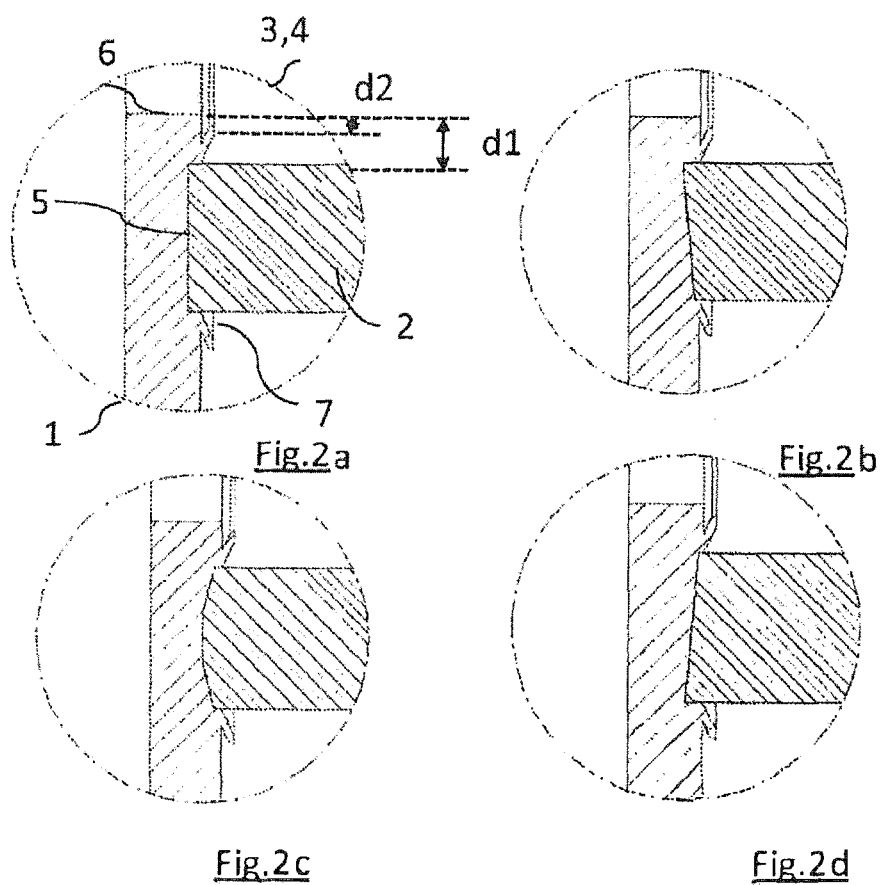
FIGS. 2a, 2b, 2c and 2d show alternative configurations for the joint site.

At the shaft, the joining area 3 is finally in contact with connection area 4. The end face 5 of the shaft 2 is shown in details in FIGS. 2a, 2b, 2c and 2d. The end face as shown in FIG. 2a is a flat end face. The position of the end face in relation to the hub 1 and the inner opening circumference 6 is shown in this figure. The shaft end face 5 is placed a distance d1 away from inner circumference 6.

The shaft material will be steel and the hub will be made of aluminium or another low weight metal or alloy.

Due to the friction welding, the heated, soft material escapes from the joining area 3 and forms a projection 7 of material around the shaft's end face 5. The joining area is allocated in a way to avoid that the melted material flow to the edge of the hub. The distance d2 between the inner circumference 6 and the end position of the melted material is at least 1 mm to maintain dimension and structure of the hub 1. So the joining area 3 is allocated so that d1>d2 is realized, wherein d2 is approximately between 1 to 5 mm.

A projection or protrusion 7 of the material of the joint site is obtained after the friction welding, and this projection or protrusion 7 can be machined, for example, after the friction welding in order to obtain a rounded portion 7.

The face end 5 of the shaft can be optimized or the welding process and the joint. Alternative solutions are shown in the FIGS. 2a through 2d. FIG. 2a shows a flat end face parallel to the flat area 4 of the hub and perpendicular to the long axis of the shaft. FIGS. 2b and 2d show inclined faces 5 that result in asymmetric joints. The solution of FIG. 2c shows a curved or convex end face of the shaft 2.

To produce a composite work piece of a shaft 2 for a clutch having a connection area 4 of a hub part, first of all a one-piece hub unit—comprising the hub part and the connection area—is produced. Then hub and shaft are connected by friction welding.

Figure 3:
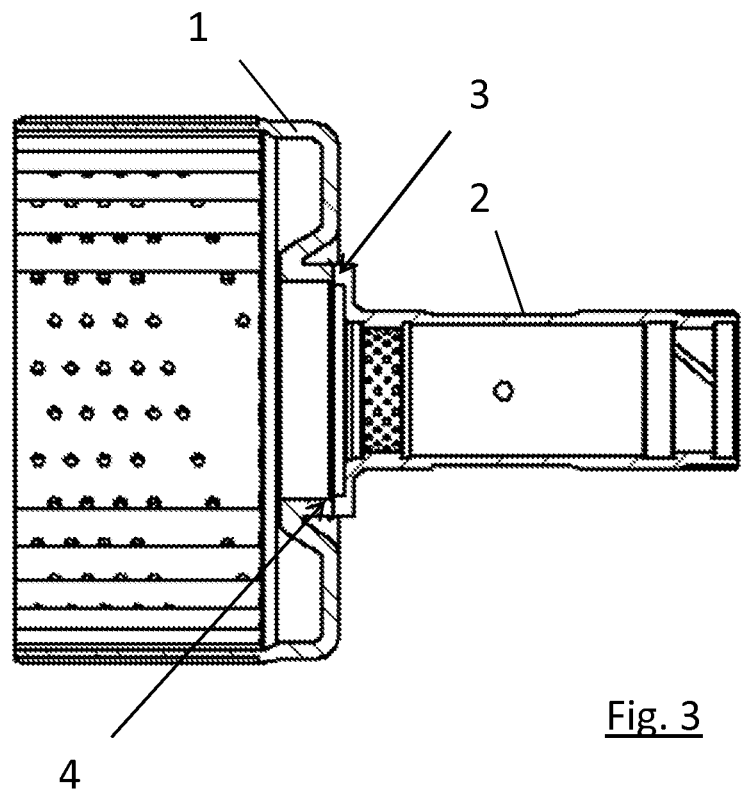
FIG. 3 illustrates a shaft and a hub part of a clutch configured to be friction welded along a connection area to define a joint site in accordance with an alternative embodiment of the present invention.

FIG. 3 shows a further embodiment of the invention. The shaft 2—the harder part—is a shaft of a clutch. The hub 1—the softer part—is a clutch hub. The connection area 4 is formed as a tubular end fitting formed in the radial shoulder 8 of the hub 1. This tubular end fitting has an end face which is normal to the axis of the hub 1, the shaft 2. The connection area 3 of the harder part—the shaft 2—is arranged at a saucer-shaped end piece and formed at its border area. The connection area is flat shaped—normal to the axis of the shaft 2.

Figure 4:
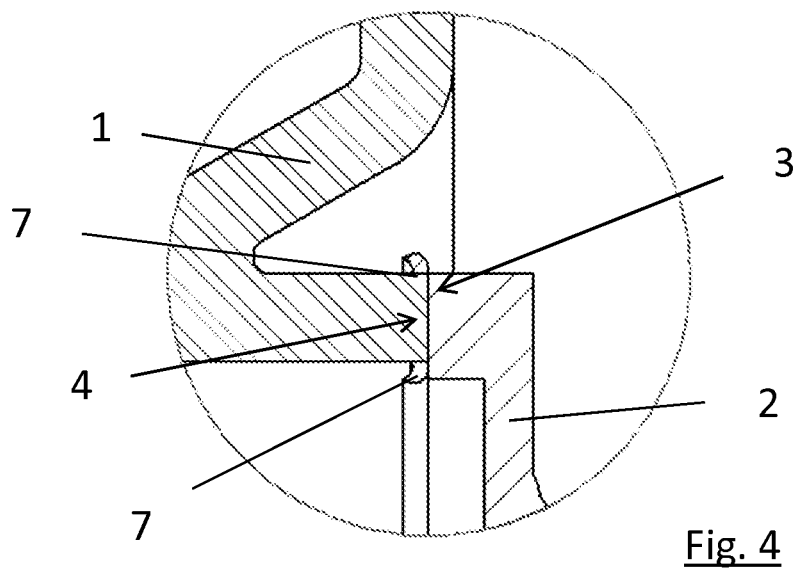
FIG. 4 is an enlarged partial view of FIG. 3 showing the connection area in greater detail.

FIG. 4 shows an enlarged view of the connection between the hub 1 and the shaft 2 with the displaced material 7—the protrusion—made by friction welding.

Figure 5:
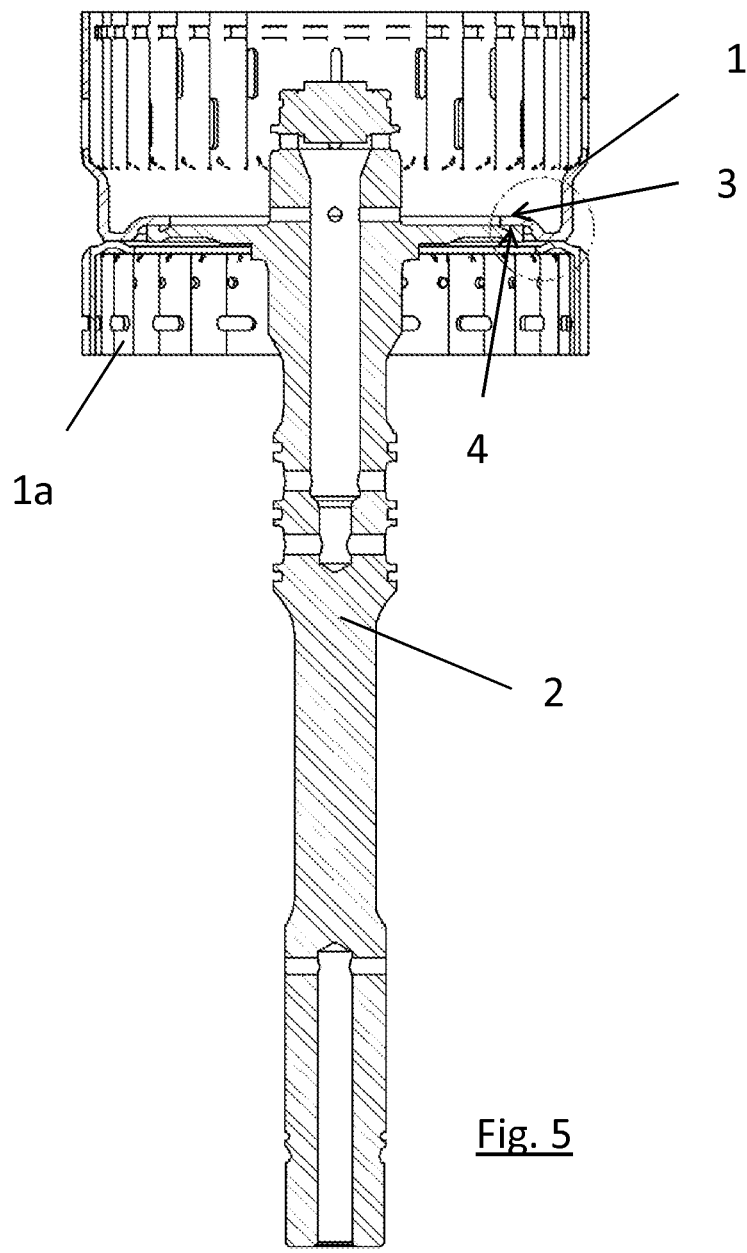
FIG. 5 illustrates another alternative embodiment of a shaft and a hub part of a clutch including a second hub/housing part and configured to define two distinct joint sites.

FIG. 5 shows an embodiment of the invention with two friction welding joints. A softer part—hub 1—is connected with a harder part—a shaft 2. This joining location is tubular shaped—the shaft 2 has a saucer-shaped end piece and is connected with the radial shoulder of the hub 1.

Figure 6:
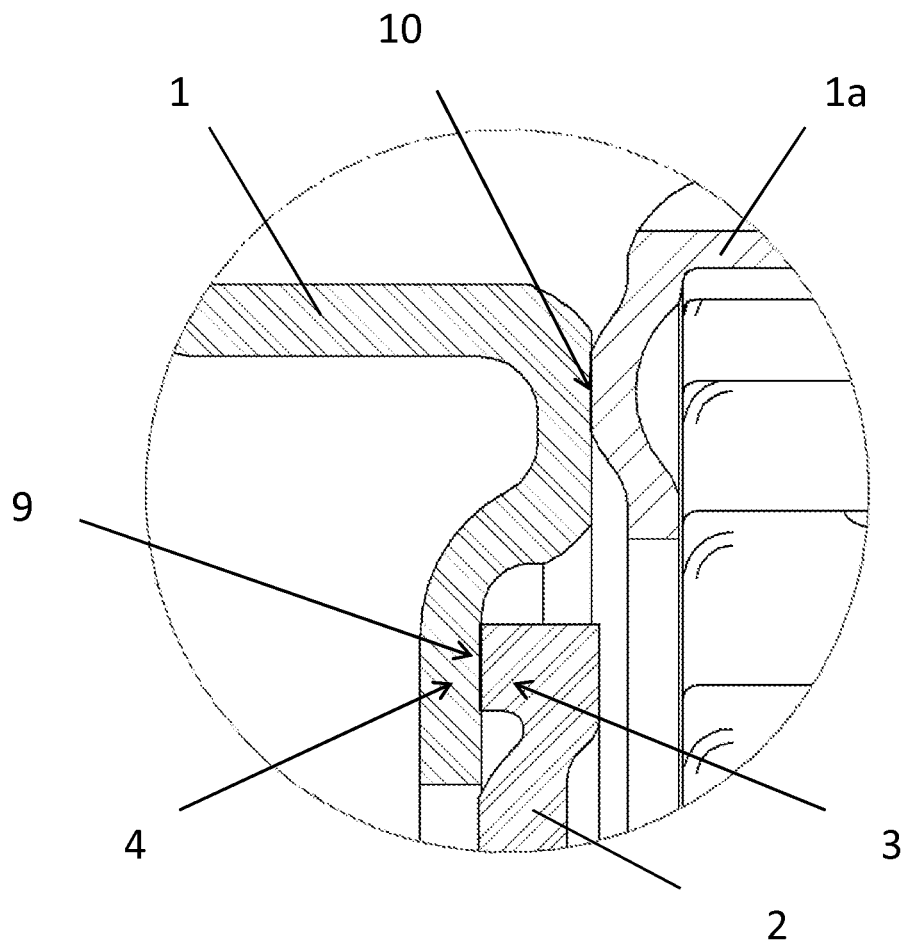
FIG. 6 is an enlarged partial view of FIG. 5 showing the two joint sites in greater detail.

A second hub or a housing 1a—a soft or a hard part—is connected with the hub 1 in a further joining location 10 with flat shape—concentric to the inner joining location 9 between the shaft 2 and the hub 1. FIG. 6 is an enlarged view of the two joining locations 9, 10 between the shaft 2 and the hub 1 or between the hub 1 and the hub 1a. As shown the end face design of the tubular side can differ from a flat design.

Figure 7:
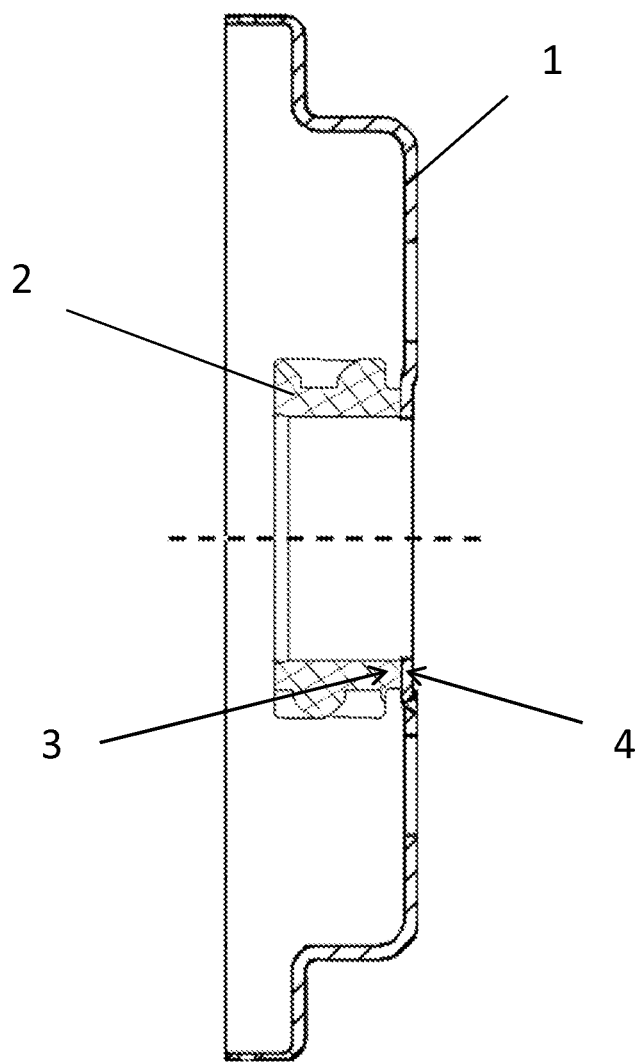
FIG. 7 illustrates a gear and hub part configured to be friction welded along a connection area to define a joint site in accordance with yet another alternative embodiment of the present invention.

FIG. 7 shows an embodiment of the invention—a connection between a hub 1 and a gear 2. The end face design of the tubular side 3 can differ from a flat design 4 of the hub.

LIST OF REFERENCE SIGNS

1 Hub
2 Shaft or gear
3 Joining area with tubular shape
4 Joining area with flat shape
5 End face of shaft
6 Inner circumference
7 Protrusion
8 radial shoulder
d1, d2 distance
1a Hub or housing
9 Joining Location
10 Joining Location

The invention claimed is:

1. A joint site formed by friction welding of a shaft or a gear of a hard material with a hub of a softer material to define a composite workpiece, wherein the shaft or the gear has a tubular shape extending along a longitudinal axis to an end face being joined to a connection area of the hub, with the connection area having a flat face formed by a radial shoulder of the hub extending perpendicular to the longitudinal axis, such that the joint site extends radially along the flat face of the hub part.

2. The joint site according to claim 1 wherein the radial shoulder extends radially to an inner opening and the connection area of the hub is located at a defined distance spaced radially outwardly from the inner opening of the hub.

3. The joint site according to claim 2 wherein the defined distance is more than a thickness of a protrusion formed by melted material.

4. The joint site according to claim 3 wherein a remaining distance extends between the protrusion formed by the melted material and the inner opening of the hub.

5. The joint site according to claim 4 wherein the defined distance is more than the remaining distance.

6. The joint site according to claim 1 wherein the end face of the shaft or gear is flat and perpendicular to the longitudinal axis.

7. The joint site according to claim 1 wherein the end face of the shaft or gear is inclined to the shaft longitudinal axis.

8. The joint site according to claim 1 wherein the end face of the shaft or gear is convex shaped.

9. The joint site according to claim 1 wherein joint sites of the shaft or gear and the hub, after the welding, are arranged at an angle of between 10[deg.] to 20[deg.], to one another.

10. The joint site according to claim 1 wherein the hub and the shaft or gear are parts of a clutch.

11. The joint site according to claim 9 wherein the joint sites are at an angle of 15[deg.] to one another.

12. The joint site according to claim 1 wherein the connection area is formed as a tubular end fitting formed in the radial shoulder of the hub.

13. A composite workpiece having a friction weld joint joining a shaft or gear of a hard material with a hub part of a softer material, wherein the shaft or gear has a tubular shape extending along a longitudinal axis to an end face joined to a connection area of the hub part via the friction weld joint, the connection area of the hub part having a flat face formed by a radial shoulder portion of the hub part extending transversely toward the longitudinal axis, such that the friction weld joint extends radially along the flat face of the hub part.

14. The composite workpiece according to claim 13 wherein the radial shoulder portion of the hub part extends radially inwardly to an inner opening, the connection area of the hub part is spaced radially outwardly a predefined first distance from the inner opening of the hub part.

15. The composite workpiece according to claim 14 wherein the first distance is more than a thickness dimension of a protrusion formed by melted and solidified material of the friction weld joint.

16. The composite workpiece according to claim 15 wherein a second distance is defined between the protrusion and the inner opening of the hub part, and wherein the first distance is greater than the second distance.

17. The composite workpiece according to claim 13 wherein the end face of the shaft or gear is flat and configured to extend perpendicular to the longitudinal axis of the shaft or gear.

18. The composite workpiece according to claim 13 wherein the end face of the shaft or gear is flat and configured to extend at an oblique incline relative to the longitudinal axis of the shaft or gear.

19. The composite workpiece according to claim 13 wherein the end face is convex shaped.

* * * * *